No. 770,945. PATENTED SEPT. 27, 1904.
R. M. TULLER.
NUT AND BOLT LOCK.
APPLICATION FILED SEPT. 29, 1903.
NO MODEL.
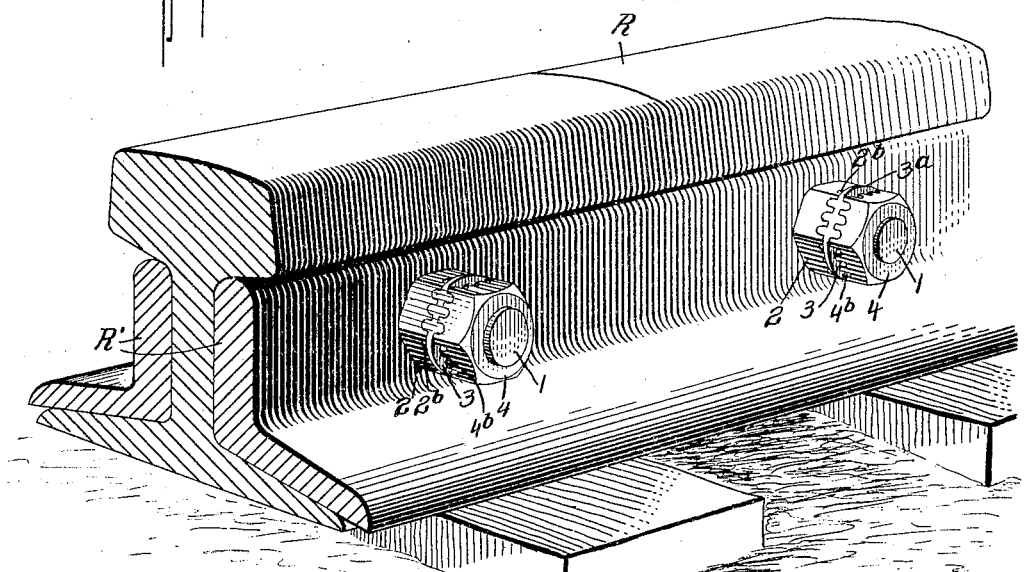
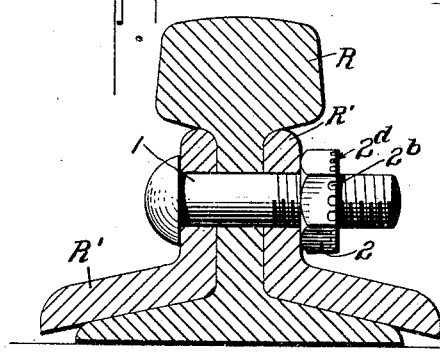
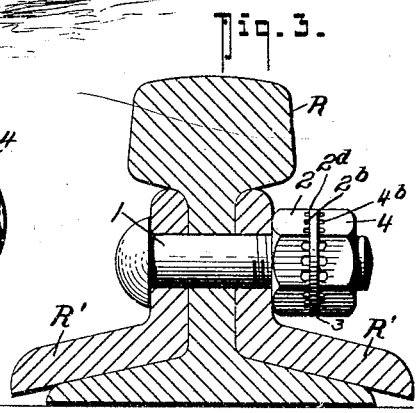
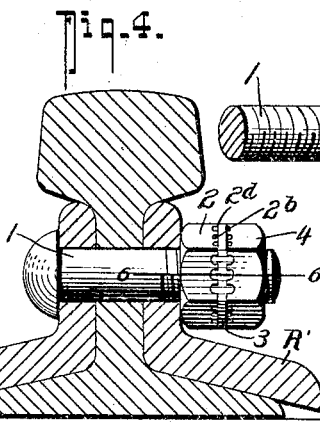
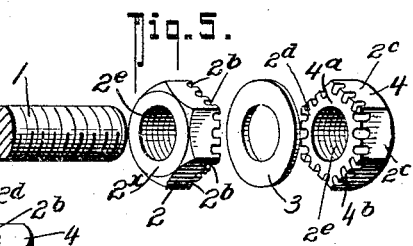
WITNESSES:
F. C. Gibson.
John T. Schrott
INVENTOR
Romane M. Tuller.
BY
Fred G. Dieterich
ATTORNEYS No. 770,945.

Patented September 27, 1904.

UNITED STATES PATENT OFFICE.

ROMANE M. TULLER, OF DENVER, COLORADO, ASSIGNOR OF ONE-HALF TO WILLIAM SCHEIDENBERGER, OF DENVER, COLORADO.

NUT AND BOLT LOCK.

SPECIFICATION forming part of Letters Patent No. 770,945, dated September 27, 1904.

Application filed September 29, 1903. Serial No. 175,023. (No model.)

*To all whom it may concern:*

Be it known that I, ROMANE M. TULLER, residing at Denver, in the county of Denver and State of Colorado, have invented a new and Improved Nut and Bolt Lock, of which the following is a specification.

This invention relates more particularly to that type of nut-locks in which a plurality of locking-nuts are fitted upon a threaded bolt and adapted to interlock or be held into tight engagement with each other or with the bolt.

In the class of nut-locks referred to it has been usual to provide a bolt having right and left threaded portions to receive a pair of correspondingly-threaded nuts and a supplemental means for interlocking the nuts with each other to prevent the turning of the said nuts upon their respective bolt-threads after being forced home to their locked position.

My invention in its generic nature comprehends a pair of locking-nuts of like construction—that is, having their bolt-apertures threaded on the same pitch, whereby to readily screw onto a bolt threaded in one direction only—whereby they can be easily applied to any of the ordinary types of bolts whose threaded portion has threads of one pitch and the threaded end of the same diameter throughout its length, the said nuts being also provided with opposing faces of like construction arranged to coöperate with the locking means slidably mounted on the bolt adapted to engage with the said opposing nut-faces to lock the two nuts together to prevent either of the said nuts working loose or turning off the bolt.

In its more subordinate features my invention consists in the novel construction of nut and bolt means hereinafter fully described, and particularly pointed out in the appended claim, reference being had to the accompanying drawings, in which—

Figure 1 is a perspective view showing my invention as applied for use. Fig. 2 is a cross-section thereof, showing the first nut in position. Fig. 3 is a similar view, the second nut and washer being shown in position. Fig. 4 is a similar view, the washer being upset to engage the grooves in the nut. Fig. 5 is a detail perspective view of the bolt and the nuts detached. Fig. 6 is a detail cross-section on the line 6 6 of Fig. 2. Fig. 7 is a detail view hereinafter specifically referred to.

Referring now to the accompanying drawings, in which like numerals and letters of reference indicate like parts in all of the figures, 1 designates the bolt, which, as shown in the drawings, may be of the ordinary construction and which I have shown as applied for securing the rail R and the fish-plates R' together. The fastening or securing nut 2 may also be of the ordinary construction, with the exception that in one face $2^d$ thereof I form a series of grooves or cut-away portions $2^b$, semiconically shaped in longitudinal section and which extend from the edge face $2^c$ toward the central threaded bolt-receiving aperture $2^e$ for about one-half or two-thirds the distance. After screwing the securing-nut 2 tightly in position, as shown in Fig. 4, with its smooth face $2^x$ against the fish-plate R', I place a washer 3 upon the bolt against the groove-face $2^d$ of the nut 2, and the said washer 3 preferably has in practice a radius equal to the radius of the outer circle inclosing the geometric figure of the nut, so as to have a portion $3^a$ of the washer above the face $2^d$ (see Fig. 3) for the purpose presently explained. Next I screw the jam-nut 4, which is precisely of the same construction and of practically the same size as the securing-nut 2, on the bolt 1, and the said jam-nut is screwed on with its groove-face $4^a$ against the washer 3, the jam and securing nuts being preferably both of the same size. The parts are now in the position shown in Fig. 3. I then take a punch of the same thickness as the washer and about one-half inch wide and after placing it on the periphery of the washer (see dotted lines, Fig. 6) I strike it with a suitable hammer, and thereby force the washer portion $4^y$ into the grooves $2^b$ $4^b$, as shown in Fig. 4, the washer then serving to hold the two nuts 2 and 4 tightly locked together, and hence they will be prevented from turning off the bolt. Instead of forcing the washer into the grooves in the manner shown in Figs. 1 and 4 I may force the washer into alternate grooves on different faces, as shown in detail in Fig. 7, if I find it more convenient to do so.

From the foregoing it will be seen that even when my lock is in use on bolts for holding wood or other material subject to shrinkage or where the bolt is likely to be kept in motion the nuts will remain in their locked position and not loosen or work off the bolts. Again, it will be seen that in the application of my invention no special form of bolt is required; but any ordinary form of bolt now in common use may be used in my improved nut-lock means.

While I have shown my invention as applied for use on railroad-rails and while it is more especially adapted for such use, yet I desire it understood that I may use the same wherever the ordinary bolt and nut now in common use are adapted to be used.

I am aware that bolt and nut locks have heretofore been provided in which a pair of nuts having their opposing faces mounted to coöperate with a device specially designed to engage with the two nuts and the specially-designed bolt and in which each nut has an especial arrangement of threads for engaging the coöperative portions of the bolt. My invention, so far as I know, differentiates from what has heretofore been provided in lock-nut devices of the character stated in the peculiar coöperative arrangement of the two nuts of like construction adapted to independently thread onto the bolt and when locked with each other to firmly bind or grip their respective bolt portions to prevent their becoming loose or turning off under the ordinary conditions and yet be capable of being readily turned off in unison under a lever or wrench action.

Having thus described my invention, what I claim, and desire to secure by Letters Patent, is—

An improvement in nut-locks, comprising in combination with a bolt of a uniform diameter and having its end uniformly threaded in one direction only, of a pair of nuts of exactly the same construction, and each having a threaded aperture to coöperate with the threaded end of the bolt, said nuts each having their opposite edges notched radially and at an angle to the axial line of their bolt-apertures, a circular metallic disk arranged between said nuts, said disk being of greater diameter than the diameter of the outer circle containing the outline of the nut, to permit the edge of the disk to project beyond the nut-faces and to be upset into the grooves of the nuts, said nuts and disk being so arranged that when the nuts have been secured into position they will be joined together and held from movement with respect to each other for the purposes specified.

ROMANE M. TULLER.

Witnesses:
THOMAS HARRISON,
A. C. BANTOW.